(12) United States Patent
Ibaragi (10) Patent No.: US 11,273,451 B2
(45) Date of Patent: Mar. 15, 2022

(54) SILICON ROD CRUSHING METHOD AND APPARATUS, AND METHOD OF PRODUCING SILICON LUMPS

(71) Applicant: SUMCO CORPORATION, Tokyo (JP)

(72) Inventor: Hiromi Ibaragi, Tokyo (JP)

(73) Assignee: SUMCO CORPORATION, Tokyo (JP)

( * ) Notice: Subject to any disclaimer, the term of this patent is extended or adjusted under 35 U.S.C. 154(b) by 343 days.

(21) Appl. No.: 16/427,834

(22) Filed: May 31, 2019

(65) Prior Publication Data

US 2019/0374955 A1 Dec. 12, 2019

(30) Foreign Application Priority Data

Jun. 12, 2018 (JP) .............................. JP2018-112229

(51) Int. Cl.
*B02C 19/18* (2006.01)
*B02C 23/36* (2006.01)

(52) U.S. Cl.
CPC .............. *B02C 19/18* (2013.01); *B02C 23/36* (2013.01); *B02C 2019/183* (2013.01)

(58) Field of Classification Search
CPC ................ B02C 19/18; B02C 19/0056; B02C 2019/183; B02C 23/36
See application file for complete search history.

(56) References Cited

U.S. PATENT DOCUMENTS

| | | | | |
|---|---|---|---|---|
| 3,062,458 A * | 11/1962 | Dearing | ................. | B02C 13/13 241/19 |
| 3,208,674 A * | 9/1965 | Bailey | ....................... | F42D 3/04 241/1 |
| 4,540,127 A * | 9/1985 | Andres | .................... | B02C 19/18 241/1 |
| 5,748,563 A * | 5/1998 | Hofmann | ................ | B02C 19/18 367/147 |
| 5,758,831 A * | 6/1998 | Collins | ................. | B02C 19/186 241/1 |
| 5,842,650 A * | 12/1998 | Hofmann | ................ | B29B 17/02 241/1 |
| 6,024,306 A * | 2/2000 | Koppl | ................. | B02C 19/0056 241/1 |
| 6,039,274 A * | 3/2000 | Zinoviev | ................. | B02C 19/18 241/1 |

(Continued)

FOREIGN PATENT DOCUMENTS

| CN | 103232040 A | 8/2013 |
|---|---|---|
| CN | 107350056 A | 11/2017 |

(Continued)

OTHER PUBLICATIONS

English translation for WO 2015143572 Mar. 26, 2014.*

(Continued)

*Primary Examiner* — Faye Francis
(74) *Attorney, Agent, or Firm* — Greenblum & Bernstein, P.L.C.

(57) ABSTRACT

A silicon rod crushing method relatively moves an application position of high-voltage pulse discharge to a silicon rod in a longitudinal direction thereof while rotating the silicon rod to thereby crush the silicon rod.

20 Claims, 9 Drawing Sheets

1A

(56) References Cited

U.S. PATENT DOCUMENTS

| | | | | |
|---|---|---|---|---|
| 7,677,486 B2* | 3/2010 | Hoppe | B02C 19/18 | 241/301 |
| 8,138,952 B2* | 3/2012 | Muller-Siebert | B02C 19/18 | 341/1 |
| 10,399,085 B2* | 9/2019 | Muller | B09B 3/00 | |
| 2001/0040196 A1* | 11/2001 | Kolberg | B02C 19/0087 | 241/1 |
| 2005/0051644 A1* | 3/2005 | Paris | B02C 19/18 | 241/1 |
| 2005/0124842 A1* | 6/2005 | Paris | C10J 3/18 | 588/1 |
| 2006/0163392 A1* | 7/2006 | Hoppe | B02C 19/18 | 241/1 |
| 2007/0187539 A1* | 8/2007 | Hoppe | B02C 19/18 | 241/301 |
| 2012/0205472 A1* | 8/2012 | Bentaj | B02C 19/18 | 241/1 |
| 2015/0069153 A1* | 3/2015 | Ahlqvist Jeanneret | B02C 23/06 | 241/1 |
| 2016/0082402 A1* | 3/2016 | Kitada | B01F 13/0003 | 241/1 |
| 2016/0279643 A1* | 9/2016 | Muller-siebert | B02C 25/00 | |
| 2018/0006468 A1* | 1/2018 | Kappeler | H02J 7/00 | |
| 2018/0043368 A1* | 2/2018 | Muller-Siebert | B02C 23/12 | |
| 2018/0353968 A1* | 12/2018 | Weh | B02C 23/36 | |
| 2019/0374955 A1* | 12/2019 | Ibaragi | B02C 19/0056 | |
| 2021/0094043 A1* | 4/2021 | Yuan | B02C 19/18 | |
| 2021/0187572 A1* | 6/2021 | Lin | B02C 19/18 | |

FOREIGN PATENT DOCUMENTS

| | | | | |
|---|---|---|---|---|
| DE | 1211568 B | * | 3/1966 | F42D 1/00 |
| EP | 3122463 | | 2/2017 | |
| JP | 11-47625 | | 2/1999 | |
| JP | 2014-231464 A | | 12/2014 | |
| JP | 2017-515774 | | 6/2017 | |
| WO | 2015/143572 | | 10/2015 | |

OTHER PUBLICATIONS

Office Action for JP App. No. 2018-112229, dated Mar. 30, 2021 (w/ translation).

Extended European Search Report for EP 19179401.5, dated Nov. 8, 2019.

* cited by examiner

SILICON ROD CRUSHING METHOD AND APPARATUS, AND METHOD OF PRODUCING SILICON LUMPS

BACKGROUND OF THE INVENTION

Field of the Invention

The present invention relates to a method of producing silicon lumps as the raw material of a silicon single crystal by crushing a silicon rod and a silicon rod crushing apparatus.

Description of Related Art

Many silicon single crystals used as a substrate material for semiconductor devices are manufactured by the Czochralski method (CZ method). In the CZ method, polysilicon lumps filled in a quartz crucible is heated to generate a silicon melt. Then, a seed crystal is dipped into the silicon melt and slowly pulled up to grow a large single crystal at the lower end of the seed crystal.

Polysilicon lumps as the base material of a silicon single crystal are produced by crushing a high-purity polysilicon rod manufactured by a vapor phase growth method. Specifically, as a method of crushing the polysilicon rod, a method that throws a high-temperature polysilicon rod into water for rapid cooling to apply thermal shock thereto, a method that hits a polysilicon rod with a hammer or the like, and a method that crushes a polysilicon rod with a machine like a jaw crusher are generally used.

As a method of easily crushing the polysilicon rod, Japanese patent application Laid-open No. 2017-515774 describes a method that crushes a polysilicon rod by applying high-voltage pulse discharge thereto, in which the application position of the high-voltage pulse discharge is moved along the longitudinal direction of the polysilicon rod so as to efficiently crush the polysilicon rod over the entire length thereof.

Further, although not directly related to the polysilicon rod crushing method, Japanese patent application laid-open No. H11-47625 describes a method that applies high-voltage pulse discharge to a cylindrical object to be crushed made of reinforced concrete while rotating the object and moving the same in the longitudinal direction thereof.

However, in the polysilicon rod crushing method described in Japanese patent application laid-open No. 2017-515774, the application position of the high-voltage pulse discharge is merely moved along the longitudinal direction of the polysilicon rod, so that the polysilicon is finely crushed near an electrode applying the high-voltage pulse discharge, while it is coarsely crushed at larger distance from the electrode, resulting in a large variation in crushing size. Specifically, the polysilicon rod is finely crushed at its upper side near the electrode, while a large lump remains at the lower side far from the electrode, resulting in poor yield of polysilicon lumps having a size of about 10 mm to about 50 mm which is suitable for pulling-up of a single crystal according to the CZ method.

Further, in the conventional crushing method described in Japanese patent application laid-open No. H11-47625, a rotating device and a moving carriage for an object to be crushed are provided in water, so that when the object to be crushed is the polysilicon rod, the polysilicon lumps may be significantly contaminated by the rotating device and moving carriage. That is, the crushing method for the reinforced concrete cannot be simply applied to the polysilicon crushing method.

SUMMARY

The object of the present invention is therefore to provide a polysilicon rod crushing method and apparatus and a method of producing silicon lumps capable of improving the yield of silicon lumps of a size suitable for pulling-up of a silicon single crystal.

To solve the above problems, a silicon rod crushing method according to the present invention relatively moves an application position of high-voltage pulse discharge to a silicon rod in a longitudinal direction thereof while rotating the silicon rod to thereby crush the silicon rod.

According to the present invention, the application position of the high-voltage pulse discharge can be moved helically along the circumferential surface of the silicon rod, whereby high-voltage pulse power can be applied from substantially all directions of the circumferential surface of the silicon rod. Thus, the crushing size of the silicon can be made more uniform than in conventional crushing methods, allowing improvement in the yield of silicon lumps that can be used in a single crystal pulling-up process.

In the present invention, it is preferable that the silicon rod is placed on a looped endless sheet, and the endless sheet is rotated to rotate the silicon rod. In this case, it is preferable that the height position of one loop end of the endless sheet is made lower than the height position of the center of the silicon rod, and the silicon rod is rotated such that the application position of the high-voltage pulse discharge to the silicon rod goes toward the one loop end of the endless sheet. According to this method, it is possible to rotate the silicon rod at a fixed position while maintaining the horizontal attitude of the silicon rod and further to limit the landing location of silicon lumps falling downward.

In the present invention, it is preferable that the silicon rod is placed on a pair of parallel rollers, and the parallel rollers are rotated to rotate the silicon rod. Even with such a method, it is possible to rotate the silicon rod at a fixed position while maintaining the horizontal attitude of the silicon rod.

In the present invention, it is preferable that the silicon rod is housed in a container, at least two electrodes are provided near an outer peripheral surface of the silicon rod, and the electrodes are moved relative to the silicon rod to move the application position of high-voltage pulse discharge by the electrodes along the longitudinal direction of the silicon rod. According to this method, the application position of the high-voltage pulse discharge can be moved helically along the circumferential surface of the silicon rod, whereby high-voltage pulse power can be applied from substantially all directions of the circumferential surface of the silicon rod.

The silicon rod crushing method according to the present invention preferably houses the silicon rod in a container together with liquid, sets the silicon rod in the liquid, and moves at least one of the container and electrode pair relative to the silicon rod to move the application position of the high-voltage pulse discharge by the electrodes in the longitudinal direction of the silicon rod. This allows the silicon rod to be efficiently crushed.

The silicon rod crushing method according to the present invention preferably drives the endless sheet using a drive source provided outside the container. This makes it possible to crush the silicon to a uniform size while suppressing contamination of the icon rod as much as possible and thus to improve the yield of silicon lumps that can be used in a single crystal pulling-up process.

In the present invention, it is preferable that a plurality of collection containers are provided below the silicon rod so as to be arranged along the longitudinal direction of the silicon rod, and silicon lumps obtained by crushing the silicon rod are made to fall down into the collection containers. This allows the silicon lumps to be easily collected.

In the present invention, it is preferable that the collection containers are made of resin and have a structure having many holes or a mesh structure. Thus, the silicon lumps having a size equal to or larger than a certain value can be easily collected after completion of the crushing process, and the silicon lumps can be transferred to a washing process in a state of being put in the collection container and then be subjected to washing with hydrofluoric acid or nitrohydrofluoric acid.

A silicon rod crushing apparatus according to the present invention includes a container that houses therein a silicon rod, a rotary support mechanism that rotatably supports the silicon rod in the container, a high-voltage pulse discharge device that applies high-voltage pulse discharge to the silicon rod, and a moving mechanism that moves an application position of the high-voltage pulse discharge along a longitudinal direction of the silicon, rod relative to the silicon rod. The silicon rod crushing apparatus moves the application position of the high-voltage pulse discharge in the longitudinal direction of the silicon rod while rotating the silicon rod in the container to thereby crush the silicon rod.

According to the present invention, the application position of the high-voltage pulse discharge can be moved helically along the circumferential surface of the silicon rod, whereby high-voltage pulse power can be applied from substantially all directions of the circumferential surface of the silicon rod. Thus, the crushing size of the silicon can be made more uniform than in conventional crushing methods, allowing improvement in the yield of silicon lumps that can be used in a single crystal pulling-up process.

In the present invention, it is preferable that the rotary support mechanism includes a looped endless sheet, and the endless sheet is rotated in a state where the silicon rod is placed thereon to rotate the silicon rod. In this case, it is preferable that the rotary support mechanism further includes a first rotary shaft that supports one loop end of the endless sheet and a second rotary shaft that supports the other loop end of the endless sheet, the first rotary shaft is disposed in the container such that a height position of the one loop end of the endless sheet is lower than a height position of a center of the silicon rod, the second rotary shaft is disposed above the first rotary shaft such that a height position of the other loop end of the endless sheet is higher than the height position of the center of the silicon rod, and the silicon rod is rotated such that silicon lumps obtained by crushing the silicon rod due to application of the high-voltage pulse discharge are directed to the one loop end. With this configuration, it is possible to rotate the silicon rod at a fixed position while maintaining the horizontal attitude of the silicon rod and further to limit the landing location of silicon lumps falling downward.

In the present invention, it is preferable that the rotary support mechanism includes a pair of parallel rollers, and the parallel rollers are rotated with the silicon rod placed on the parallel rollers to rotate the silicon rod. Even with such a method, it is possible to rotate the silicon rod at a fixed position while maintaining the horizontal attitude of the silicon rod.

In the present invention, it is preferable that the high-voltage pulse discharge device has at least two electrodes disposed near an outer peripheral surface of the silicon rod, and the moving mechanism moves the container in the longitudinal direction of the silicon rod to move, relative to the silicon rod, the positions of the electrodes along the longitudinal direction of the silicon rod. With this configuration, the application position of the high-voltage pulse discharge can be moved helically along the circumferential surface of the silicon rod, whereby high-voltage pulse power can be applied from substantially all directions of the circumferential surface of the silicon rod.

In the present invention, it is preferable that a drive source for rotating the silicon rod is provided outside the container. This makes it possible to make the crushing size of the silicon while suppressing contamination of the silicon rod as much as possible and thus to improve the yield of silicon lumps that can be used in a single crystal pulling-up process.

It is preferable that the silicon rod crushing apparatus according to the present invention further includes a plurality of collection containers which are provided below the silicon rod so as to be arranged along the longitudinal direction of the silicon rod, and silicon lumps obtained by crushing the silicon rod are made to fall down into the collection containers.

In the present invention, it is preferable that the collection containers are made of resin and have a structure having many holes or a mesh structure. With this configuration, the silicon lumps having a size equal to or larger than a certain value can be easily collected after completion of the crushing process, and the silicon lumps can be transferred to a washing process in a state of being put in the collection container and then be subjected to washing with hydrofluoric acid or nitrohydrofluoric acid.

Further, a method of producing silicon lumps according to the present invention includes a step of producing a silicon rod and a step of crushing the silicon rod according to the above-described silicon rod crushing method according to the present invention.

According to the present invention, the application position of high-voltage pulse discharge can be moved helically along the circumferential surface of the silicon rod, whereby high-voltage pulse power can be applied from substantially all directions of the circumferential surface of the silicon rod. Thus, the crushing size of the silicon can be made more uniform than in conventional crushing methods, allowing improvement in the yield of silicon lumps that can be used in a single crystal pulling-up process.

In the present invention, the step of crushing the silicon rod preferably includes a step of making silicon lumps obtained by crushing the silicon rod fall down into collection containers. This allows the silicon lumps to be easily collected.

The method of producing silicon lumps according to the present invention preferably further includes a step of washing the silicon lumps housed in the collection containers with hydrofluoric acid or nitrohydrofluoric acid. This allows smooth transfer from the crushing step to the washing step.

According to the present invention, there can be provided a silicon rod crushing method and apparatus and a silicon lump producing method capable of improving the yield of silicon lumps of an adequate size while suppressing contamination as much as possible.

BRIEF DESCRIPTION OF THE DRAWINGS

The above and other objects, features and advantages of this invention will become more apparent by reference to the following detailed description of the invention taken in conjunction with the accompanying drawings, in which:

FIGS. 3A and 3B are views each schematically illustrating the positional relationship between the polysilicon rod 2 and electrodes 32, and particularly, FIG. 3A illustrates a state before the water tank 10 is slid, and FIG. 3B illustrates a state after the water tank 10 is slid;

FIGS. 4A and 4B are schematic views for explaining the relationship between the moving speed of the electrode and the rotating speed of the polysilicon rod, and particularly, FIG. 4A illustrates a case where the moving speed of the electrodes is higher, or the rotating speed of the polysilicon rod is lower, and FIG. 4B illustrates a case where the moving speed of the electrodes is lower, or the rotating speed of the polysilicon rod is higher;

DETAILED DESCRIPTION OF THE EMBODIMENTS

Hereinafter, preferred embodiments of the present invention will be described in detail with reference to the accompanying drawings.

Figure 1:
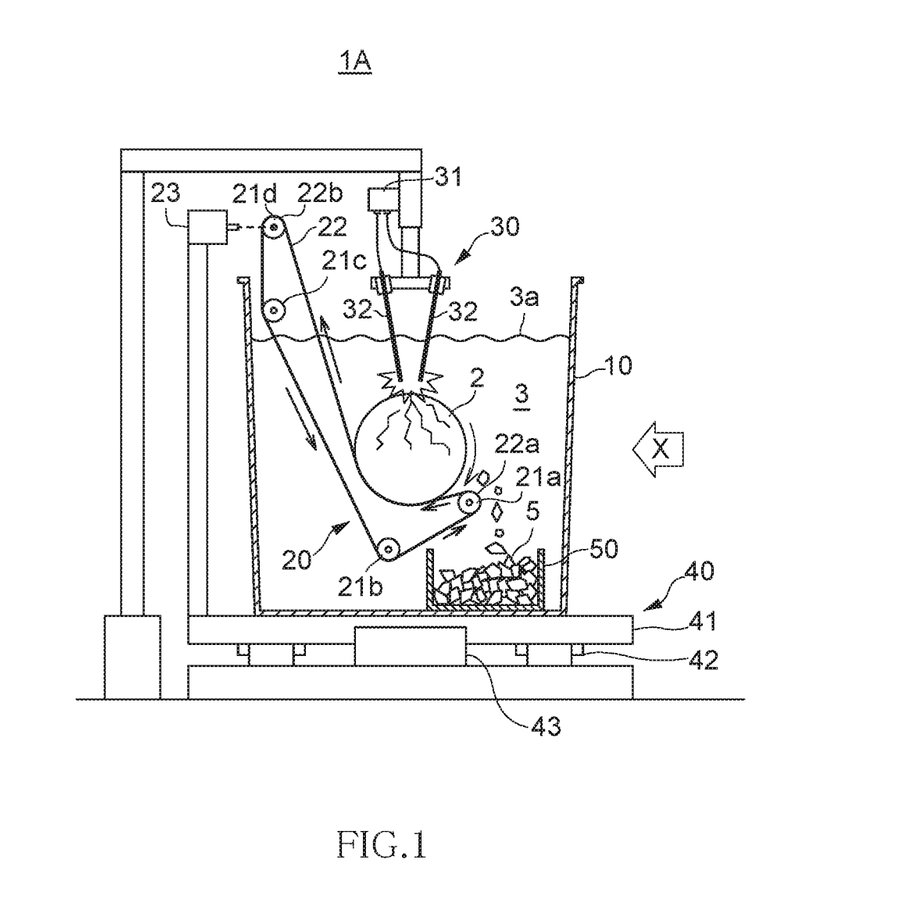
FIG. 1 is a schematic cross-sectional view illustrating the configuration of a silicon rod crushing apparatus 1A according to a first embodiment of the present invention.
Figure 2:
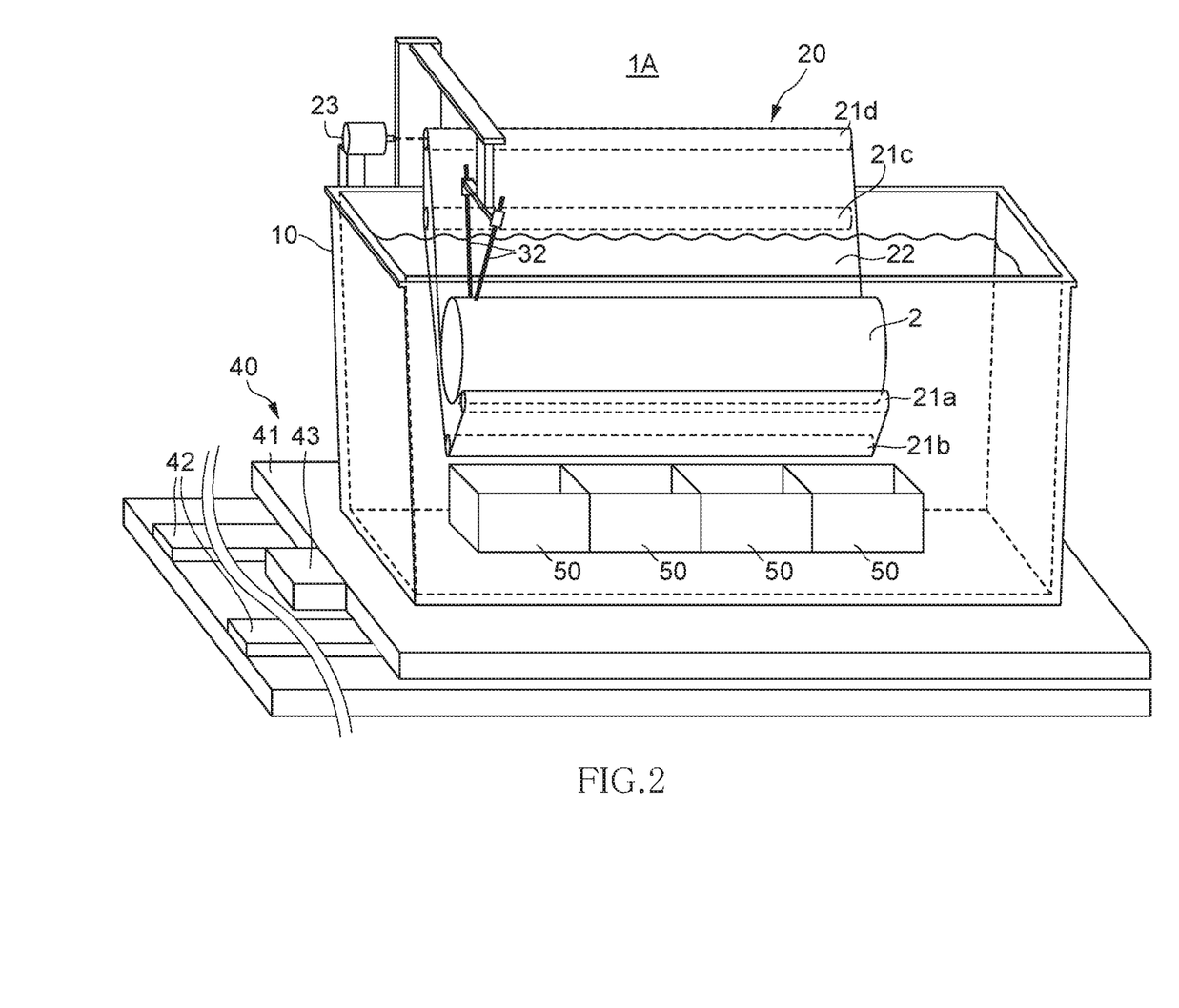
FIG. 2 is a schematic side view of the silicon rod crushing apparatus as viewed in the X-direction shown in FIG. 1.

FIG. 1 is a schematic cross-sectional view illustrating the configuration of a silicon rod crushing apparatus 1A according to a first embodiment of the present invention. FIG. 2 is a schematic side view of the silicon rod crushing apparatus 1A as viewed in the X-direction shown in FIG. 1.

As illustrated in FIGS. 1 and 2, the silicon rod crushing apparatus 1A has a water tank 10 that houses a polysilicon rod 2 and liquid 3, a rotary support mechanism 20 that rotatably supports the polysilicon rod 2 in the water tank 10, a high-voltage pulse discharge device 30 that applies high-voltage pulse discharge to the polysilicon rod 2, and a moving mechanism 40 that moves the water tank 10 forward and backward in the longitudinal direction thereof.

The polysilicon rod 2 (cut rod) is obtained by cutting a high-purity polysilicon manufactured by, e.g., a vapor phase growth method as the base material of a silicon single crystal into a predetermined length. The water tank 10 is a container having a sufficiently larger volume than the size of the polysilicon rod 2 and, when the water tank 10 is filled with the liquid 3 such as pure water, the polysilicon rod 2 in the water tank 10 is surrounded by the liquid 3. As the water tank 10 and the liquid 3 to be used in the present embodiment, those having no possibility of contaminating the polysilicon rod 2 are preferably selected.

The rotary support mechanism 20 has a plurality of rotary shafts 21a to 21d, a looped endless sheet 22 wound on the rotary shafts 21a to 21d, and a drive source 23 such as a motor that drives/rotates at least one (in this example, rotary shaft 21d) of the rotary shafts 21a to 21d. The polysilicon rod 2 is placed on the main surface of the endless sheet 22 stretched between the rotary shafts 21a and 21b and supported by the endless sheet 22 so as to maintain its horizontal attitude in the water. The polysilicon rod 2 placed on the endless sheet 22 can be rotated at a fixed position by rotating the endless sheet 22 together with the rotary shafts 21a to 21d.

There is no particular restriction on the material of the endless sheet 22 as long as the polysilicon rod 2 can be rotatably supported and, for example, a polyurethane sheet can be used as the endless sheet 22. Although the endless sheet 22 according to the present embodiment is a single sheet having a large width that covers substantially the entire length of the polysilicon rod 2, it may be divided in the longitudinal direction of the polysilicon rod 2 into a plurality of sheets with a gap interposed between mutually adjacent sheets.

The height position of the rotary shaft 21a positioned to the right of the polysilicon rod 2 in FIG. 1 is preferably lower than the height position of the center of the polysilicon rod 2. This allows the height position of one loop end 22a of the endless sheet 22 to be lower than the center of the polysilicon rod 2, allowing silicon lumps obtained by crushing the polysilicon rod 2 to fall below the polysilicon rod 2.

On the other hand, the height position of the rotary shaft 21d positioned on the opposite side (left side in FIG. 1) of the rotary shaft 21a with respect to the polysilicon rod 2 is preferably higher than the center of the polysilicon rod 2 and, more preferably, higher than the top of the water tank 10. This allows the height position of the other loop end 22b of the endless sheet 22 to be higher than the height position of the polysilicon rod 2. In particular, the drive source 23 that drives/rotates the rotary shaft 21d can be disposed outside the water tank 10, thereby making it possible to prevent contamination of the polysilicon rod 2.

The rotary shafts 21a and 21b are immersed in the water, so that they are preferably made of a material having no possibility of contaminating the polysilicon rod 2; however, taking mechanical strength into consideration, a metal material is preferably used. Thus, for example, it is preferable to constitute the center shaft of each of the rotary shafts 21a and 21b by metal such as stainless steel and to coat the exposed surface thereof with fluororesin.

In the present embodiment, the rotary shaft 21c is disposed above the water surface; however, it may be immersed in the water. In this case, like the rotary shafts 21a and 21b, the rotary shaft 21c is also preferably made of a material having no possibility of contaminating the polysilicon rod 2 and having high mechanical strength. There is no particular restriction on the number and positions of the rotary shafts as long as the endless sheet 22 can be driven/rotated, and various configurations may be adopted.

The high-voltage pulse discharge device 30 has high-voltage pulse oscillator 31 and at least two electrodes 32 connected to the high-voltage pulse oscillator 31. The leading ends of the respective electrodes 32 are inserted into the water and are positioned near the upper outer peripheral surface of the horizontally-installed polysilicon rod 2.

The high-voltage pulse discharge device 30 applies high-voltage pulse discharge several tens to several thousands of times during one rotation of the polysilicon rod 2. When the high-voltage pulse discharge period is shortened, the crushing size of the polysilicon rod 2 can be made fine, while when the high-voltage pulse discharge period is prolonged, the crushing size can be made large. Voltage to be applied to the electrodes 32 is preferably 100 kV to 300 kV, and the frequency of the high-voltage pulse is preferably 0.5 Hz to 40 Hz.

The moving mechanism 40 has a support base 41 on which the water tank 10 and rotary support mechanism 20 are placed, a guide rail 42 that regulates the moving direction of the support base 41, and a traveling mechanism 43 that drives the support base 41. The guide rail 42 is laid in the longitudinal direction of the polysilicon rod 2 held in the water tank 10.

In the present embodiment, the high-voltage pulse discharge device 30 is not moved together with the moving mechanism 40 but fixed in place. Thus, when the water tank 10 is slid together with the moving mechanism 40, the positions of the electrodes 32 above the polysilicon rod 2 are relatively moved along the longitudinal direction of the polysilicon rod 2.

When the rotary shafts 21a to 21d are disposed as described above, the polysilicon rod 2 is rotated clockwise. By thus rotating the polysilicon rod 2 such that the application position of the high-voltage pulse discharge above the polysilicon rod 2 goes toward the one loop end 22a of the endless sheet 22, the polysilicon lumps generated by crushing the polysilicon rod 2 at the upper outer periphery thereof can be made to fall immediately. At this time, the polysilicon lumps can be made to fall reliably since the rotary shaft 21a and endless sheet 22 do not protrude laterally.

During the crushing process, the polysilicon rod 2 may be rotated counterclockwise on the endless sheet 22. For example, when the raw material still keeps a rod shape as illustrated in FIG. 1, the polysilicon rod 2 is crushed while it is rotated counterclockwise together with the endless sheet 22, and then the rotation direction of the endless sheet 22 is reversed to the clockwise direction after the polysilicon rod 2 is finely crushed to thereby make the crushed raw material fall down to a collection container side, thus allowing efficient collection of the crushed raw material. Further, when the endless sheet 22 is divided in the longitudinal direction into a plurality of sheets, the polysilicon rod 2 on the endless sheets 22 is crushed while it is rotated counterclockwise, and every time crushing in an area corresponding to the width of each sheet is completed, the endless sheet 22 is reversely rotated clockwise for collection of the fine raw materials.

In the present embodiment, a plurality of collection containers 50 are arranged along the longitudinal direction of the polysilicon rod 2 at the landing location of polysilicon lumps 5. This allows the polysilicon lumps 5 obtained by crushing the polysilicon rod 2 through application of pulse power from one end to the other end thereof in the longitudinal direction of the polysilicon rod 2, to be collected in the collection containers 50. Further, the polysilicon lumps 5 can be subdivided in the early stage of the crushing process, thus simplifying quantitative distribution of the polysilicon lumps 5. Each of the collection containers 50 preferably has a size capable of holding the polysilicon lumps 5 in an amount corresponding to about 5 kg to 10 kg.

In the present embodiment, the collection container 50 preferably has a structure having many holes or a mesh structure that allows no polysilicon lumps 5 to pass therethrough and allows liquid to pass therethrough. Further, the collection container 50 is preferably made of fluororesin. With this configuration, after the liquid 3 is drawn off from the water tank 10 after completion of the crushing process, or after overflowing dirty supernatant contaminated with floating silicon fragments, to clear it off, the polysilicon lumps 5 having a size equal to or larger than a certain value can be easily collected from the liquid, whereby the polysilicon lumps 5 can be transferred to a washing process in a state of being put in the collection container 50 and then be subjected to washing with hydrofluoric acid or nitrohydrofluoric acid.

Figure 3A:
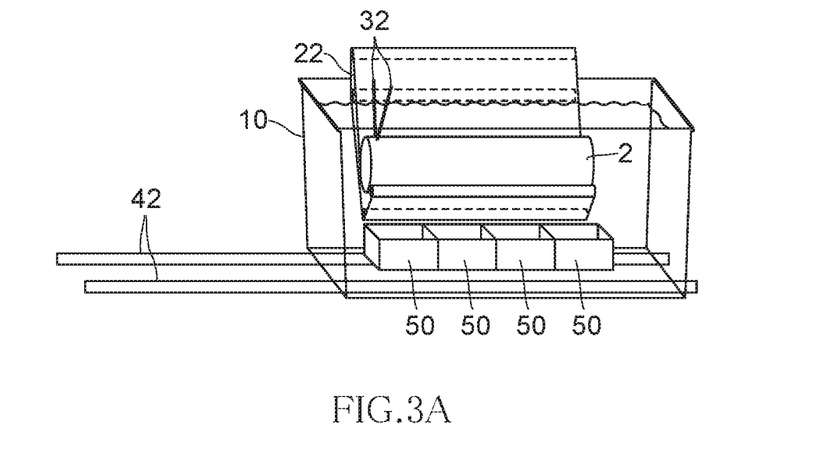
Figure 3B:
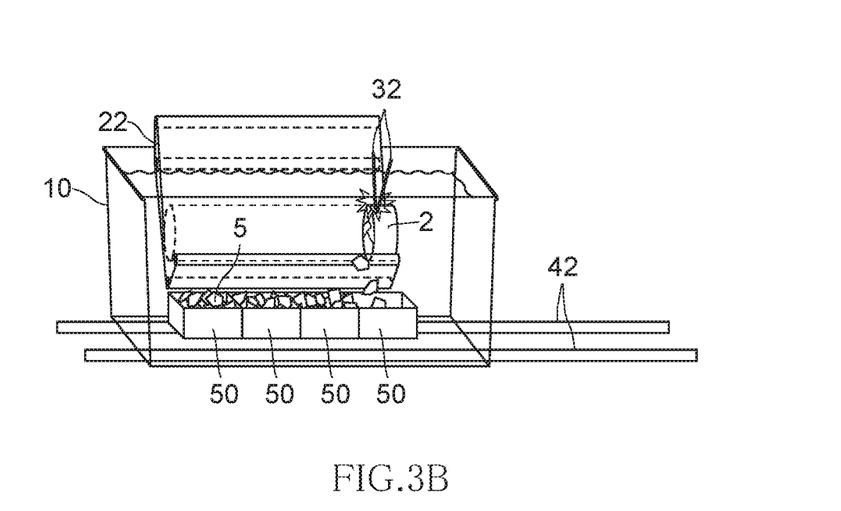

FIGS. 3A and 3B are views each schematically illustrating the positional relationship between the polysilicon rod 2 and electrodes 32. FIG. 3A illustrates a state before the water tank 10 is slid, and FIG. 3B illustrates a state after the water tank 10 is slid.

At the start of the crushing process of the polysilicon rod 2, the water tank 10 is positioned at the right end side of the guide rail 42 as illustrated, e.g., in FIG. 3A, and the electrodes 32 are positioned at the left end side of the polysilicon rod 2.

As illustrated in FIG. 3B, when the water tank 10 is moved to the left along the guide rail 42, the polysilicon rod 2 is also moved together with the water tank 10, and the electrodes 32 are moved to the right side of the polysilicon rod 2. By thus relatively moving the electrodes 32 from one end to the other end in the longitudinal direction of the polysilicon rod 2, the polysilicon rod 2 can be crushed over the entire length thereof.

When the polysilicon rod 2 is rotated at this time, the electrodes 32 can be moved helically along the circumferential surface of the polysilicon rod 2, whereby high-voltage pulse power can be applied from substantially all directions of the circumferential surface of the polysilicon rod 2. The polysilicon lumps 5 obtained by crushing the polysilicon rod 2 fall downward from the crushing position to be held in the collection containers 50.

Figure 4A:
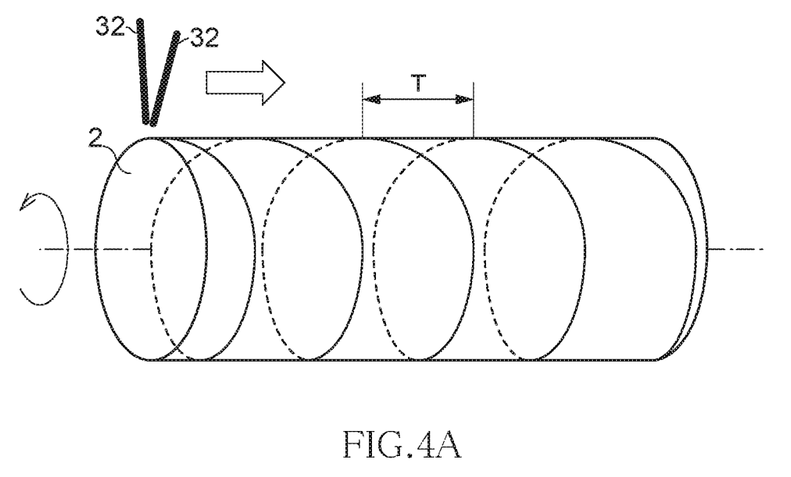
Figure 4B:
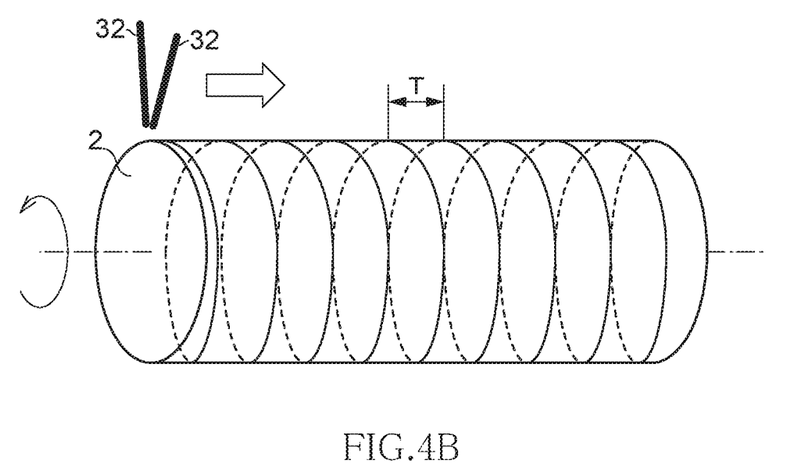

FIGS. 4A and 4B are schematic views for explaining the relationship between the moving speed of the electrode 32 and the rotating speed of the polysilicon rod 2. FIG. 4A illustrates a case where the moving speed of the electrodes 32 is higher, or the rotating speed of the polysilicon rod 2 is lower, and FIG. 4B illustrates a case where the moving speed of the electrodes 32 is lower, or the rotating speed of the polysilicon rod 2 is higher.

As illustrated in FIG. 4A, when the moving speed of the electrodes 32 is higher than the rotating speed of the polysilicon rod 2, a crushing period T of the polysilicon rod 2 is prolonged, so that the polysilicon lumps 5 having a comparatively large size can be obtained.

On the other hand, as illustrated in FIG. 4B, when the moving speed of the electrodes 32 is lower than the rotating speed of the polysilicon rod 2, the crushing period T of the polysilicon rod 2 is shortened, so that the polysilicon lumps 5 having a comparatively small size can be obtained.

Thus, by adjusting the moving speed of the electrodes 32 along the longitudinal direction of the polysilicon rod 2 and the rotating speed of the polysilicon rod 2, the acquisition rate of the polysilicon lumps of a size suitable for pulling-up of a silicon single crystal according to the CZ method can be improved.

As described above, the silicon rod crushing method according to the present embodiment moves the application position of the high-voltage pulse discharge in the longitudinal direction of the polysilicon rod 2 while rotating the polysilicon rod 2 in the water, thereby allowing high-voltage pulse power to be applied from substantially all directions of the circumferential surface of the polysilicon rod 2. Therefore, it is possible to reduce a variation in the crushing size, i.e., to solve the conventional problem that the polysilicon rod 2 is finely crushed only at the upper side and coarsely crushed only at the lower side, whereby the polysilicon lumps of an adequate size can be produced.

Figure 5:
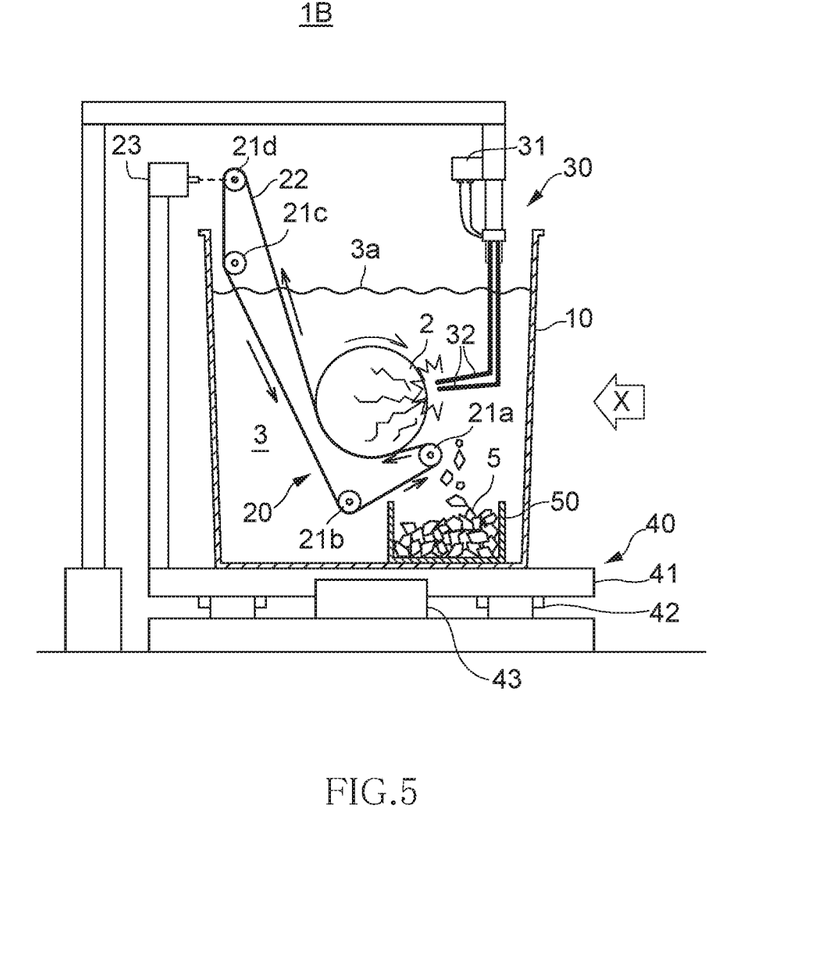
FIG. 5 is a schematic cross-sectional view illustrating the configuration of a silicon rod crushing apparatus according to a second embodiment of the present invention.

FIG. 5 is a schematic cross-sectional view illustrating the configuration of a silicon rod crushing apparatus according to a second embodiment of the present invention.

As illustrated in FIG. 5, a silicon rod crushing apparatus 1B applies high-voltage pulse discharge through the electrodes 32 not from the upper side, but from the lateral side (in this example, from the right side in FIG. 5). According to the present embodiment, the polysilicon lumps 5 fall along the right side of the polysilicon rod 2. Thus, the landing location of the polysilicon lumps 5 is limited to make it easy to collect the polysilicon lumps 5.

Figure 6:
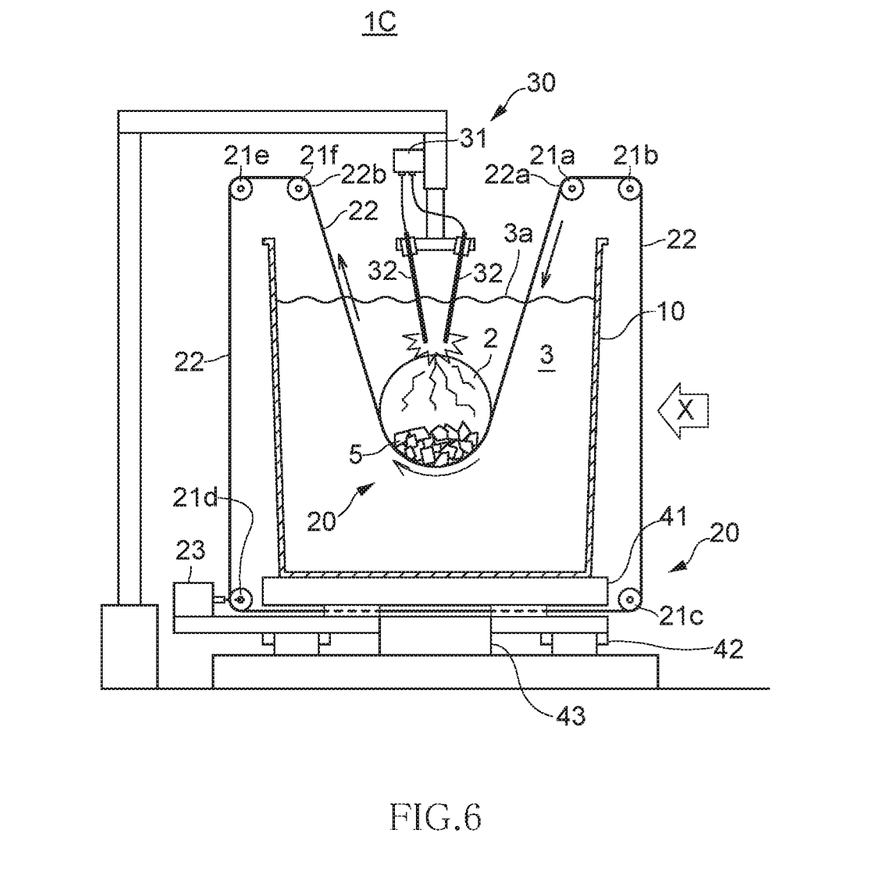
FIG. 6 is a schematic cross-sectional view illustrating the configuration of a silicon rod crushing apparatus according to a third embodiment of the present invention.

FIG. 6 is a schematic cross-sectional view illustrating the configuration of a silicon rod crushing apparatus according to a third embodiment of the present invention.

As illustrated in FIG. 6, in a silicon rod crushing apparatus 10, only the endless sheet 22 supporting the polysilicon rod 2 exists in the water tank 10, and six rotary shafts 21a to 21f are all disposed outside the water tank 10. Thus, not only the rotary shaft 21a positioned to the right of the polysilicon rod 2, but also the rotary shaft 21f positioned to the left of the polysilicon rod 2 is disposed at a position higher than the center of the polysilicon rod 2. Further, the height positions of respective loop ends 22a and 22b of the endless sheet 22 are higher than the height position of the polysilicon rod 2. The endless sheet 22 entering the water tank 10 from the rotary shaft 21a side reaches the rotary shaft 21f, goes around the outside of the water tank 10, and returns to the position of the rotary shaft 21a. The drive source 23 drives the rotary shaft 21d to thereby drive/rotate the endless sheet 22.

In such a configuration, the polysilicon lumps 5 obtained by crushing remain on the endless sheet 22 and cannot be made to fall down to the bottom of the water tank 10. Therefore, the collection containers 50 are not provided on the bottom of the water tank 10. The polysilicon lumps 5 are raked and collected from the endless sheet 22 after the liquid 3 in the water tank is drawn off.

As described above, the endless sheet 22 may be divided in the longitudinal direction of the polysilicon rod 2 into a plurality of sheets. In this case, the polysilicon lumps 5 can be made to fall through a gap formed between mutually adjacent sheets to be collected in the collection containers 50.

According to the present embodiment, the rotary shafts 21a to 21f that may contaminate the polysilicon lumps 5 can be removed from the inside of the water tank 10, allowing further improvement in the quality of the polysilicon lumps 5.

Figure 7:
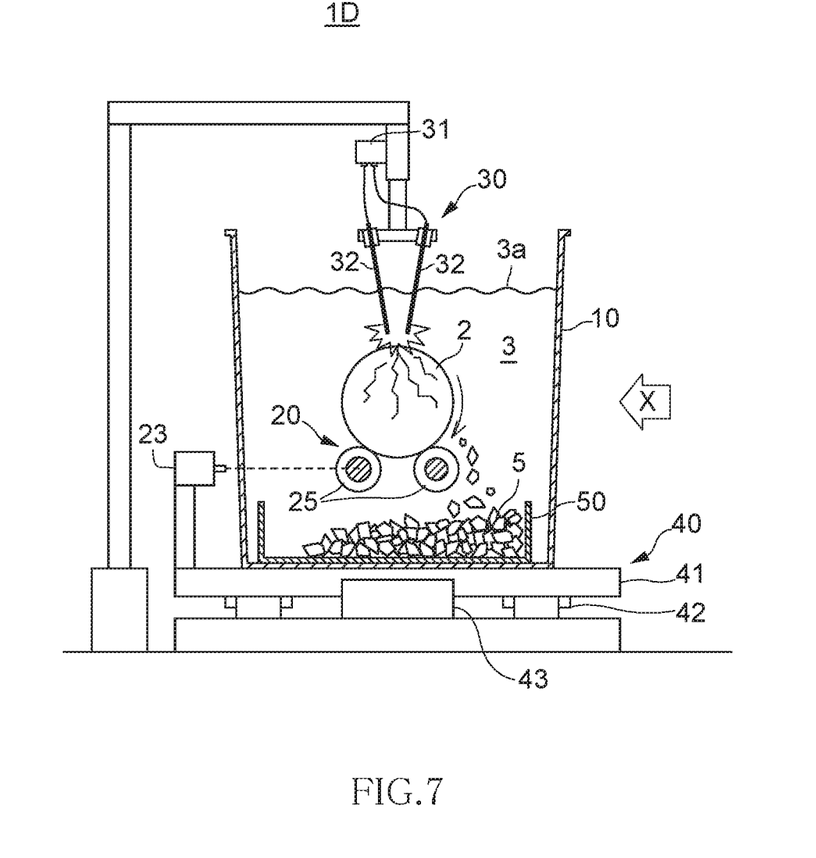
FIG. 7 is a schematic cross-sectional view illustrating the configuration of a silicon rod crushing apparatus according to a fourth embodiment of the present invention.
Figure 8:
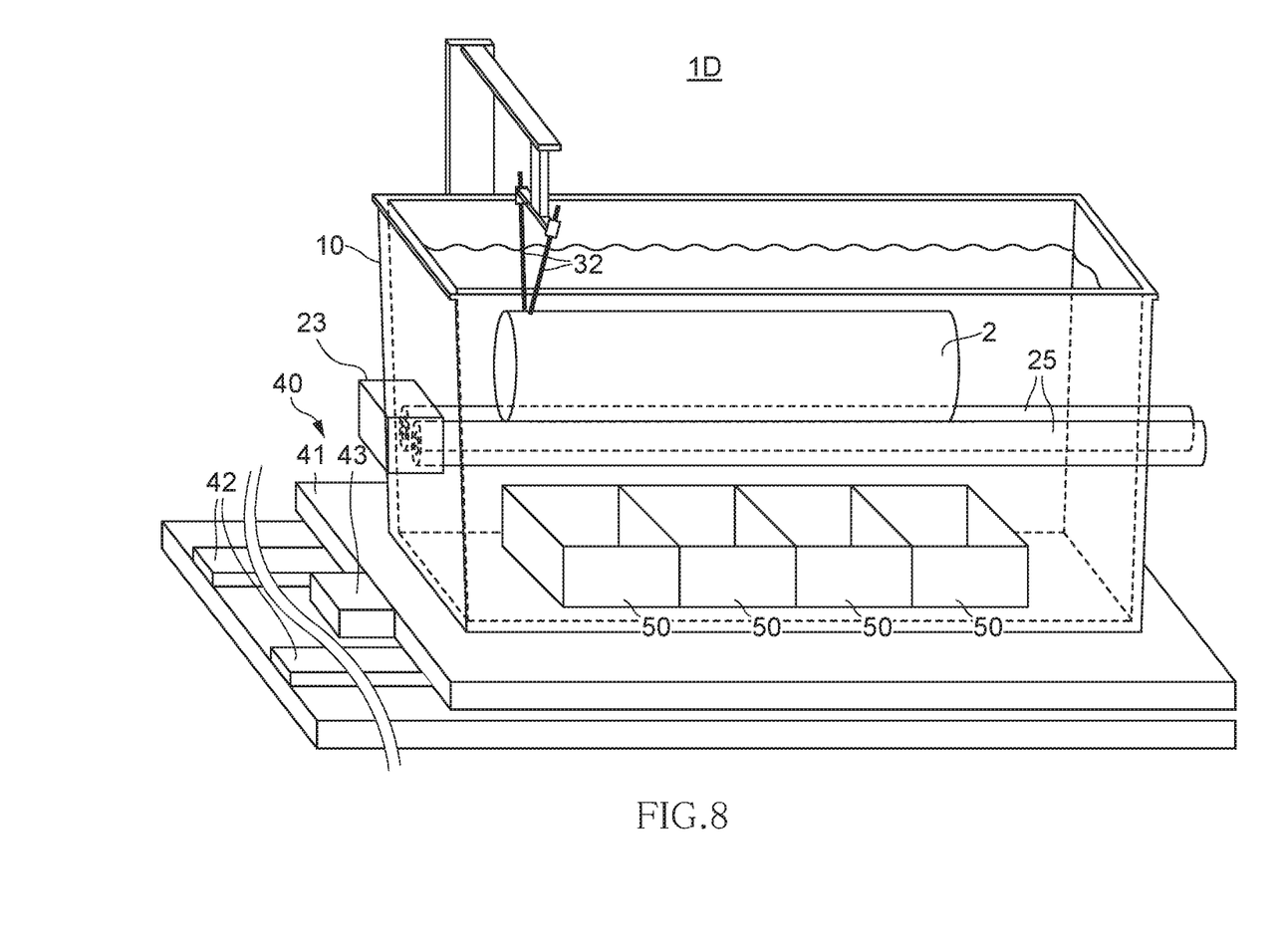
FIG. 8 is a schematic side view of the silicon rod crushing apparatus as viewed in the X-direction shown in FIG. 7.

FIG. 7 is a schematic cross-sectional view illustrating the configuration of a silicon rod crushing apparatus according to a fourth embodiment of the present invention. FIG. 8 is a schematic side view of the silicon rod crushing apparatus as viewed in the X-direction shown in FIG. 7.

As illustrated in FIGS. 7 and 8, in a silicon rod crushing apparatus 1D according to the present embodiment, a pair of rollers 25 disposed parallel to each other directly support the polysilicon rod 2. Therefore, the endless sheet 22 is not provided. At least one of the pair of rollers 25 is driven/rotated by the drive source 23, whereby the polysilicon rod 2 is also rotated. Preferably, the drive source 23 is disposed outside the water tank 10, and only the rollers 25 are disposed in the water tank 10. Although details will be described later, with the silicon rod crushing apparatus 1D according to the present embodiment, the electrodes 32 can be installed so as to sandwich the polysilicon rod 2 therebetween.

In order to prevent contamination of the polysilicon lumps 5 obtained by crushing the polysilicon rod 2, the pair of rollers 25 are preferably made of stainless steel coated with fluororesin. By coating the rotary shaft made of the stainless steel with fluororesin, contamination of the polysilicon lumps 5 can be prevented.

Figure 9:
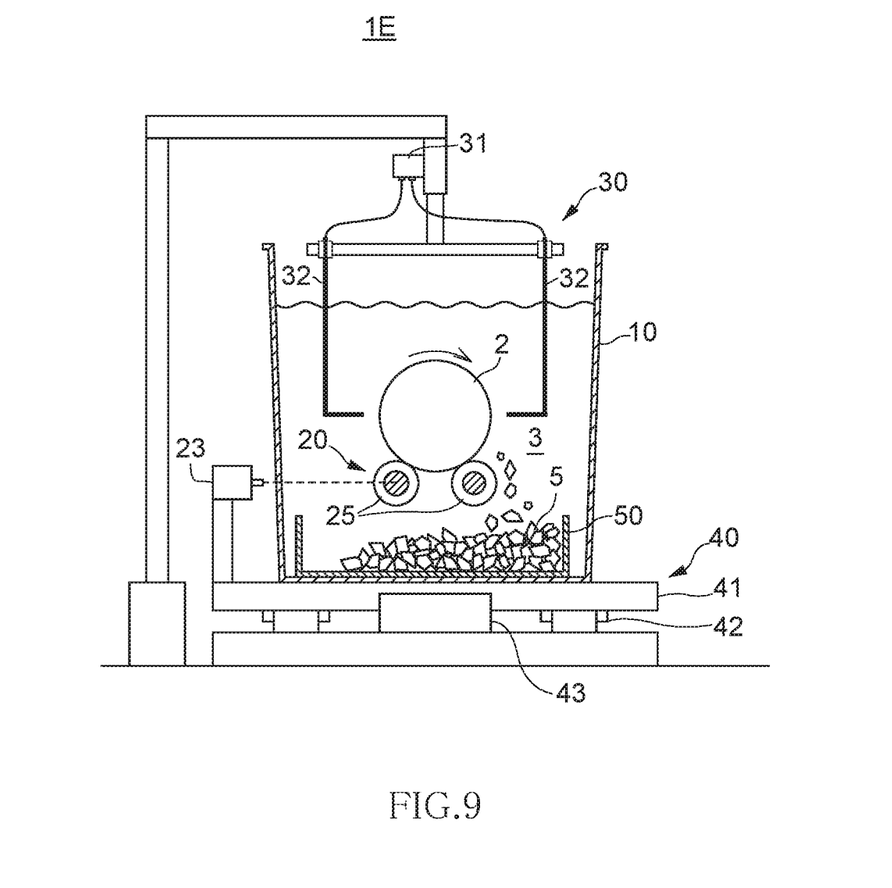
FIG. 9 is a schematic cross-sectional view illustrating the configuration of a silicon rod crushing apparatus according to a fifth embodiment of the present invention.

FIG. 9 is a schematic cross-sectional view illustrating the configuration of a silicon rod crushing apparatus according to a fifth embodiment of the present invention.

As illustrated in FIG. 9, in a silicon rod crushing apparatus 1E, the pair of electrodes 32 are disposed so as to sandwich the polysilicon rod 2 therebetween. Other configurations are the same as those of the silicon rod crushing apparatus 1D according to the fourth embodiment. When the pair of rollers 25 are used to support the polysilicon rod 2 from below as described above, the left and right spaces of the polysilicon rod 2 are opened, so that the electrodes 32 can be disposed there. In this case, it is possible to prevent the crushing size of the polysilicon rod 2 from being too small due to overconcentration of crushing energy.

As described above, the silicon rod crushing method according to the present embodiment moves the application position of the high-voltage pulse discharge in the longitudinal direction of the polysilicon rod 2 while rotating the polysilicon rod 2 in the water, so that it is possible to reduce a variation in the crushing size and thus to produce the polysilicon lumps 5 of an adequate size.

While the preferred embodiments of the present invention have been described, the present invention is not limited to the above embodiments, and various modifications may be made within the scope of the present invention, and all such modifications are included in the present invention.

For example, in the above embodiments described above, the polysilicon lumps 5 made to fall downward by crushing the polysilicon rod 2 are collected by the collection containers 50; however, in the present invention, the provision of the collection containers 50 is not necessarily required. For example, the polysilicon lumps 5 made to fall downward by crushing the polysilicon rod 2 may be made to remain on the bottom surface of the water tank 10, followed by raking and collection after drawing-off of the water from the water tank 10.

Further, in the above embodiments, the polysilicon rod 2 is slid in the longitudinal direction thereof together with the water tank 10 to move the positions of the electrodes 32 relative to the polysilicon rod 2; conversely, the electrodes 32 may be slid in the longitudinal direction of the polysilicon rod 2 with the position of the polysilicon rod 2 fixed.

Further, in the above embodiments, the polysilicon rod 2 is held in the water tank 10 together with the liquid 3 such as water and subjected to crushing in the liquid; however, in the present invention, the crushing of the polysilicon rod 2 may not necessarily be performed in the liquid, and may be performed in the air. Further, although the polysilicon rod is used as the raw material of the silicon lump in the above embodiments, a single crystal silicon rod may be used.

What is claimed is:

1. A silicon rod crushing method comprising:
using a silicon rod crushing apparatus to relatively move an application position of a high-voltage pulse discharge to a silicon rod in a longitudinal direction thereof while rotating the silicon rod to thereby crush the silicon rod,
wherein the silicon rod crushing apparatus comprises:
a container that houses therein the silicon rod;
a rotary support mechanism that rotatably supports the silicon rod in the container, and is configured to rotate the silicon rod around a central longitudinal axis of the silicon rod;
a high-voltage pulse discharge device configured to apply high-voltage pulse discharge to the silicon rod; and
a moving mechanism configured to move the application position of the high-voltage pulse discharge along the longitudinal direction of the silicon rod relative to the silicon rod,
wherein the silicon rod crushing apparatus is configured to crush the silicon rod by moving the application position of the high-voltage pulse discharge in a longitudinal direction of the silicon rod while rotating the silicon rod around the central longitudinal axis of the silicon rod in the container.

2. The silicon rod crushing method as claimed in claim 1, wherein
the silicon rod is placed on a looped endless sheet, and
the endless sheet is rotated to rotate the silicon rod.

3. The silicon rod crushing method as claimed in claim 2, wherein
a height position of one loop end of the endless sheet is made lower than a height position of a center of the silicon rod, and
the silicon rod is rotated such that the application position of the high-voltage pulse discharge to the silicon rod goes toward the one loop end of the endless sheet.

4. The silicon rod crushing method as claimed in claim 1, wherein
the silicon rod is placed on a pair of parallel rollers, and
the parallel rollers are rotated to rotate the silicon rod.

5. The silicon rod crushing method as claimed in claim 1, wherein
at least two electrodes are provided near an outer peripheral surface of the silicon rod, and
the electrodes are moved relative to the silicon rod to move the application position of high-voltage pulse discharge by the electrodes along the longitudinal direction of the silicon rod.

6. The silicon rod crushing method as claimed in claim 5, wherein
the silicon rod is housed in a container together with liquid to set into the liquid, and
at least one of the container and electrode pair are relatively moved to the silicon rod to move the application position of the high-voltage pulse discharge by the electrodes in the longitudinal direction of the silicon rod.

7. The silicon rod crushing method as claimed in claim 6, wherein the endless sheet is driven by using a drive source provided outside the container.

8. The silicon rod crushing method as claimed in claim 1, wherein
a plurality of collection containers are provided below the silicon rod so as to be arranged along the longitudinal direction of the silicon rod, and
silicon lumps obtained by crushing the silicon rod are made to fall down into the collection containers.

9. The silicon rod crushing method as claimed in claim 8, wherein the collection containers are made of resin and have a structure having many holes or a mesh structure.

10. A silicon rod crushing apparatus comprising:
a. container configured to house therein a silicon rod;
a rotary support mechanism that rotatably supports the silicon rod in the container, and is configured to rotate the silicon rod around a central longitudinal axis of the silicon rod;
a high-voltage pulse discharge device configured to apply high-voltage pulse discharge to the silicon rod; and
a moving mechanism configured to move an application position of the high-voltage pulse discharge along a longitudinal direction of the silicon rod relative to the silicon rod,
wherein the silicon rod crushing apparatus is configured to crush the silicon rod by moving the application position of the high-voltage pulse discharge in a longitudinal direction of the silicon rod while rotating the silicon rod around the central longitudinal axis of the silicon rod in the container.

11. The silicon rod crushing apparatus as claimed in claim 10, wherein
the rotary support mechanism includes a looped endless sheet, and
the endless sheet is configured to be rotated in a state where the silicon rod is placed thereon to rotate the silicon rod.

12. The silicon rod crushing apparatus as claimed in claim 11, wherein
the rotary support mechanism further includes a first rotary shaft that supports one loop end of the endless sheet and a second rotary shaft that supports the other loop end of the endless sheet,
the first rotary shaft is disposed in the container such that a height position of the one loop end of the endless sheet is lower than a height position of a center of the silicon rod,
the second rotary shaft is disposed above the first rotary shaft such that a height position of the other loop end of the endless sheet is higher than the height position of the center of the silicon rod, and
the silicon rod is rotated such that silicon lumps obtained by crushing the silicon rod due to application of the high-voltage pulse discharge are directed to the one loop end.

13. The silicon rod crushing apparatus as claimed in claim 10, wherein the rotary support mechanism includes a pair of parallel rollers, and the parallel rollers are configured to be rotated with the silicon rod placed on the parallel rollers to rotate the silicon rod.

14. The silicon rod crushing apparatus as claimed in claim 10, wherein
the high-voltage pulse discharge device has at least two electrodes disposed near an outer peripheral surface of the silicon rod, and
the moving mechanism is configured to move the container in the longitudinal direction of the silicon rod to move, relative to the silicon rod, the positions of the electrodes along the longitudinal direction of the silicon rod.

15. The silicon rod crushing apparatus as claimed in claim 14, wherein a drive source for rotating the silicon rod is provided outside the container.

16. The silicon rod crushing apparatus as claimed in in claim 10, further comprising a plurality of collection containers which are provided below the silicon rod so as to be arranged along the longitudinal direction of the silicon rod, and silicon lumps obtained by crushing the silicon rod are made to fall down into the plurality of collection containers.

17. The silicon rod crushing apparatus as claimed in claim 16, wherein the collection containers have a resin structure having many holes, or a resin mesh structure.

18. A method of producing silicon lumps comprising:
producing a silicon rod, and
crushing the silicon rod using a silicon rod crushing apparatus to relatively move an application position of a high-voltage pulse discharge to the silicon rod in a longitudinal direction thereof while rotating the silicon rod to thereby crush the silicon rod,
wherein the silicon rod crushing apparatus comprises:
a container that houses therein the silicon rod;
a rotary support mechanism that rotatably supports the silicon rod in the container, and is configured to rotate the silicon rod around a central longitudinal axis of the silicon rod;
a high-voltage pulse discharge device configured to apply high-voltage pulse discharge to the silicon rod; and
a moving mechanism configured to move the application position of the high-voltage pulse discharge along the longitudinal direction of the silicon rod relative to the silicon rod,
wherein the silicon rod crushing apparatus is configured to crush silicon rod by moving the application position of the high-voltage pulse discharge in the longitudinal direction of the silicon rod while rotating the silicon rod around the central longitudinal axis of the silicon rod in the container.

19. The method of producing silicon lumps as claimed in claim 18, further comprising making silicon lumps obtained by crushing the silicon rod fall down into collection containers.

20. The method of producing silicon lumps as claimed in claim 19 further comprising washing the silicon lumps housed in the collection containers with hydrofluoric acid or nitrohydrofluoric acid.

* * * * *